United States Patent Office 3,646,069
Patented Feb. 29, 1972

3,646,069
PROCESS FOR MANUFACTURING A
NAPHTHALIC ACID DERIVATIVE
Hitoshi Okada, Tokyo, Masaharu Kaneko, Kanagawa-ken, Yoshiaki Kato, Tokyo, and Hiroshi Honda, Kanagawa-ken, Japan, assignors to Sandoz Ltd., Basel, Switzerland
No Drawing. Filed June 16, 1969, Ser. No. 833,799
Claims priority, application Japan, June 18, 1968,
43/42,124; Oct. 7, 1968, 43/72,961
Int. Cl. C07c 63/02; C07d 7/18
U.S. Cl. 260—345.2                           4 Claims

ABSTRACT OF THE DISCLOSURE

Naphthalic acid derivatives and their anhydrides are prepared from the corresponding acenaphthene derivatives by oxidation with chromic-sulfuric acid in benzene or substituted benzenes followed by oxidation with alkali metal hypochlorite in an aqueous, alkaline medium, and recovery of the desired products which are dyestuff intermediates.

---

The present invention relates to a process for manufacturing a naphthalic acid derivative from an acenaphthene derivative. More particularly, the present invention relates to a process for manufacturing a naphthalic acid derivative having the formula

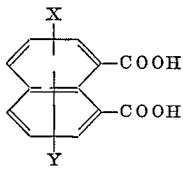

(wherein X represents halogen or nitro, and Y represents hydrogen, halogen, or nitro or an anhydride thereof) by oxidizing an acenaphthene derivative having the formula

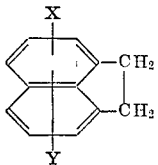

It is known to oxidize an acenaphthene derivative with an excess of alkali dichromate in the presence of a large amount of acetic acid as reaction medium to form a naphthalic acid derivative. However, it is difficult to complete the oxidation reaction which often results in the production of acenaphthene quinone, as a byproducts; if the acenaphthene derivative is to be completely oxidized, a large amount of acetic acid and a more vigorous oxidizing agent are required. It is difficult to recover all the acetic acid after completion of the reaction.

It has now been found that, benzene or derivatives thereof as a reaction medium and chromic sulfuric acid mixture as the oxidizing agent provide easy control of the reaction, a high yield and easy recovery of the reaction medium. It has also been found that the product when further oxidized with a small amount of alkali metal hypochlorite in an aqueous alkaline solution, has improved purity and solubility in an alkaline aqueous liquid.

Accordingly, one subject of this invention is to provide a process for manufacturing a naphthalic acid derivative in commercial scale. This object is accomplished according to this invention by oxidizing an acenaphthene derivative in a solvent of benzene or derivative thereof with chromic acid mixture and then, if desred, post-oyidizing the product so obtained with alkaline activatable oxidizing agent in an alkaline aqueous solution. The acenaphthene derivatives employed according to this invention have halogen and/or nitro group substituents on the ring and the derivatives include, 3-chloroacenaphthene, 4-chloroacenaphthene, 5-chloroacenaphthene, 5,6-dichloroacenaphthene, 3-bromoacenaphthene, 5-bromoacenaphthene, 3,5-dibromoacenaphthene, 5,6-dibromoacenaphthene, 3-nitroacenaphthene, 5-nitroacenaphthene, 5 - nitro - 6-chloroacenapthene, 3-nitro-5-bromoacenaphthene, 5-nitro-6-bromoacenaphthene, 3,6-dinitroacenaphthene and 5,6-dinitroacenaphthene.

The reaction medium is benzene or a derivative thereof, such as chlorobenzene, o-dichlorobenzene, nitrobenzene, o-nitrochlorobenzene or a mixture thereof. The reaction medium may or may not contain water. The solvent employed as the reaction medium must be inert to the oxidizing agent. The amount of the solvent varies with the acenaphthene derivative, and is generally up to 20 times the weight of the derivative employed.

The chromic sulfuric acid mixture may be prepared separately by dissolving sodium, potassium or ammonium dichromate in sulfuric acid. However, the dichromate and sulfuric acid can be separately added to the reaction system to form the mixture *in situ*. Instead of dichromate, chromate, such as sodium, potassium ammonium chromate, or chromic anhydride can be employed. The amount of the chromic acid mixture is from one to three times the amount theoretically required for oxidizing the acenaphthene derivative employed.

The temperature and time for the oxidation are determined by the kind of acenaphthene derivative employed; in general, the oxidation reaction is carried out at about 100° C. with agitation and continued until the yellowish brown color of the reaction system changes to green and then, gradually, to dark green. Upon completion of the reaction the organic solvent is removed, for example, by steam distillation, and the crude naphthalic acid derivative is recovered by filtration from the residual acid suspension.

The alkaline aqueous solutions for the secondary oxidation may include alkali metal hydroxides, such as sodium hydroxide and potassium hydroxide, or alkali metal salts of a weak acid, such as sodium carbonate and potassium carbonate. Aqueous sodium hydroxide solution is most suitable. The amount of the alkali metal hypochlorite varies with the hypochlorite. When sodium hypochlorite is employed, it should have about the same weight as the weight of the crude naphthalic acid derivative, and an aqueous solution containing 10% active chlorine is sufficient.

The alkali activatable oxidizing agents include sodium and potassium hypochlorite are easily available and most suitable for the purpose of this invention. The amount of the secondary oxidizing solution is determined by the raw material, oxidizing agent and base used. For example, when sodium hypochlorite is employed, aqueous sodium hydroxide solution in an amount of up to 20 times by weight of the crude naphthalic acid derivative is employed, whereby a clear aqueous alkali metal naphthalate solution is obtained. Then a mineral acid, such as sulfuric acid or hydrochloric acid, is added to the solution, and the pure naphthalic acid derivative in the free form is precipitated. If desired, the naphthalate solution is mixed first with a small amount of absorbent such as active carbon, heated and filtered; before the filtrate is treated with the mineral acid to obtain a product having good appearance.

The naphthalic acid derivative is conveniently converted into the anhydride by heating.

In both oxidation treatments, vanadium pentaoxide can be added to the reaction system to facilitate the reaction.

The naphthalic acid derivative produced according to this invention is a useful intermediate in the synthesis of dyestuffs, pigments and optical brightening agents.

This invention will be illustrated by means of the following examples which are not intended to restrict the scope of this invention.

EXAMPLE 1

67 g. of 5,6-dichloroacenaphthene was dissolved in 250 g. of nitrobenzene with heating. To the solution was added aqueous sodium dichromate solution ($Na_2Cr_2O_7 \cdot 2H_2O$ 300 g./water 300 ml.) and, then, dropwise, 390 g. of concentrate sulfuric acid was added with agitation. The mixture was refluxed at about 110° C. for two hours, with continuing agitation, and then steam distilled, whereby 235 g. of the nitrobenzene was recovered. From the residue, the oxidation product was filtered out, washed with water and dried. The yield and melting point were 65 g. and 335° C., respectively.

The product was dissolved in 5 l. of 1% aqueous sodium hydroxide solution and boiled. 50 ml. of aqueous hypochlorite solution containing about 10% of active chlorine was added to the solution. During heating for about a half hour the solution turned from cloudy to substantially transparent and light yellow. When the solution was filtered in hot state, a very small amount of solid remained on the funnel. The filtrate was acidified (as indicated by Congo Red) with concentrated sulfuric acid to precipitate crystalline 4,5-dichloronaphthalic acid which was filtered out and washed with water. Upon heating for dehydration, 61 g. of a white crystalline material having a melting point of 341° C. was obtained, this value being essentially in accord with the melting point of a pure 4,5-dichloronaphthalic anhydride produced by other processes (337°–339° C.).

EXAMPLE 2

The procedures set forth in Example 1 were repeated but instead of nitrobenzene chlorobenzene was employed. 4,5-dichloronaphthalic anhydride of substantially the same grade as that in Example 1 was obtained.

EXAMPLE 3

57 g. of 5-chloroacenaphthene was employed but other conditions were as in Example 1. 4-chloronaphthalic anhydride having a melting point of 215° C. was obtained.

EXAMPLE 4

In procedures as in Example 1, 70 g. of 5-bromoacenaphthene was employed instead of the 5-chloroacenaphthene. 4-bromonaphthalic anhydride having a melting point of 220° C. was obtained.

EXAMPLE 5

To 300 g. of nitrobenzene was added 72 g. of 5,6-dinitroacenaphthene and heated to form a solution. To the solution was added aqueous sodium dichromate ($Na_2Cr_2O_7 \cdot 2H_2O$ 300 g./water 300 ml.) and 390 g. of concentrated sulfuric acid was added, dropwise, with agitation. Then the mixture was refluxed at about 110° C. for five hours and thereafter steam distilled to recover 280° g. of nitrobenzene. From the residue, the oxidation product was filtered out, washed with water and dried. The yield and melting point of the product were 65 g. and 323° C.

The oxidation product so obtained was charged into 4.8 l. of 1% aqueous sodium hydroxide solution and heated to form a solution to which 60 ml. of aqueous sodium hypochlorite solution containing 10% of active chlorine was added; while continuing to be heated for about a half hour the solution changed from a cloudy light yellow to a substantially transparent brown. When the hot solution was filtered, a very small amount of solid material remained on the funnel. The filtrate was acidified (as indicated by Congo Red) with concentrated sulfuric acid and the precipitated 4,5-dinitronaphthalic acid was filtered, washed with water and dried to obtain yellowish brown crystals in a yield of 63 g.

The melting point of the product was 325°–327° C., substantially in accord with the melting point of commercially available pure 4,5-dinitronaphthalic anhydride (327°–329° C.).

EXAMPLE 6

The procedures in Example 5 were followed except that chlorobenzene was employed instead of nitrobenzene. The quality of the 4,5-dinitronaphthalic anhydride obtained was substantially the same as in Example 5.

EXAMPLE 7

The procedures in Example 5 were repeated but 5,6-dinitroacenaphthene was replaced by 60 g. of 5-nitroacenaphthene. 4-nitronaphthalic anhydride having a melting point of 223°–225° C. was obtained.

EXAMPLE 8

Following the procedures in Example 5, 5,6-dinitroacenaphthene was replaced by 70 g. of 5-nitro-6-chloroacenaphthene and 83 g. of 5-nitro-6-bromoacenaphthene, respectively. 4-nitro-5-chloronaphthalic anhydride (M.P. 290° C.) and 4-nitro-5-bromonaphthalic anhydride (M.P. 310° C.) were obtained.

What is claimed is:

1. A process for preparing a compound of the group consisting of naphthalic acid derivatives of the formula

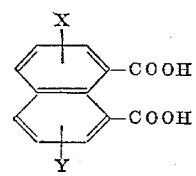

and anhydrides of said derivatives which comprises:
(a) oxidizing an acenaphthene derivative of the formula

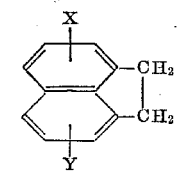

with a mixture of chromic and sulfuric acid in a solvent medium essentially consisting of benzene, chlorobenzene, dichlorobenzene, nitrobenzene, or dinitrobenzene;
(b) recovering the oxidation product; and
(c) further oxidizing said product in an alkaline, aqueous medium with an alkali metal hypochlorite, (1) in said formulas, X being chlorine, bromine, or nitro, and Y being hydrogen, chlorine, bromine or nitro.

2. A process according to claim 1, wherein said mixture is the product of a reaction between sulfuric acid and a member of the group consisting of the chromates and dichromates of ammonium, sodium, and potassium.

3. A process according to claim 1, wherein said alkali metal is sodium or potassium.

4. A process thereof according to claim 1, wherein said aqueous alkaline medium is an aqueous solution of sodium hydroxide, potassium hydroxide, sodium carbonate or potassium carbonate.

References Cited

UNITED STATES PATENTS

| | | | |
|---|---|---|---|
| 2,050,657 | 8/1936 | Greune | 260—523 |
| 2,088,829 | 8/1937 | Wyler et al. | 260—523 |
| 3,291,825 | 12/1966 | Greco | 260—523 |
| 1,997,305 | 4/1935 | May | 260—345.2 |
| 2,065,026 | 12/1936 | Rieche | 260—345.2 |
| 2,067,138 | 1/1937 | Eckert et al. | 260—345.2 |

JOHN M. FORD, Primary Examiner

U.S. Cl. X.R.

260—523 R